United States Patent

Baum

[15] 3,654,386

[45] Apr. 4, 1972

[54] DUAL RASTER TELEVISION SYSTEM

[72] Inventor: Matthew C. Baum, Washington Township, Westwood County, N.J.

[73] Assignee: Farrand Optical Co., Inc., Bronx, N.Y.

[22] Filed: Apr. 6, 1970

[21] Appl. No.: 26,035

[52] U.S. Cl. ......................178/6, 178/DIG. 37, 178/DIG. 6, 178/7.5 SE

[51] Int. Cl. ......................H04n 5/100

[58] Field of Search ..............178/6.5, 6, DIG. 23, 6, DIG. 6, 178/7.5 SE, 7.2, 7.7

[56] References Cited

UNITED STATES PATENTS 2,611,819 9/1952 Serrell............................178/DIG. 23

3,535,446 10/1970 Hilborn..................................178/7.7

*Primary Examiner*—Robert L. Griffin
*Assistant Examiner*—Barry Leibowitz
*Attorney*—Pennie, Edmonds, Morton, Taylor & Adams

[57] ABSTRACT

A television system includes one or more cameras generating signals of non-identical scenes on successive fields of a scanning pattern including line interlace. The video signals from these fields are presented over non-coincident but partially overlapping areas of a kinescope screen by means of scanning signals synchronized with those of the video signal generation but of unlike horizontal and/or vertical amplitude on the successive fields.

4 Claims, 16 Drawing Figures

INVENTOR.
MATTHEW C. BAUM
BY Pennie, Edmonds, Morton, Taylor and Adams
ATTORNEYS INVENTOR.
MATTHEW C. BAUM
BY Pennie, Edmonds, Morton, Taylor and Adams
ATTORNEYS INVENTOR
MATTHEW C. BAUM
BY Pennie, Edmonds, Morton, Taylor and Adams
ATTORNEYS INVENTOR.
MATTHEW C. BAUM
BY Pennie, Edmonds, Morton, Taylor and Adams
ATTORNEYS INVENTOR.
MATTHEW C. BAUM
BY Pennie, Edmonds, Morton, Taylor and Adams
ATTORNEYS

INVENTOR
MATTHEW C. BAUM

BY Pennie, Edmonds, Morton, Taylor and Adams
ATTORNEYS

INVENTOR.
MATTHEW C. BAUM
BY Pennie, Edmonds
Morton, Taylor and Adams
ATTORNEYS

INVENTOR.
MATTHEW C. BAUM
BY Pennie, Edmonds, Morton, Taylor and Adams
ATTORNEYS

DUAL RASTER TELEVISION SYSTEM

The present invention relates to television systems and more particularly to television systems in which one or more television cameras generate signals representative of non-identical scenes. The invention provides a television system of this type in which a scanning pattern made up of successive fields of lines is employed at a pickup or picture generating station, in one or more cameras, to generate on successive fields video signals representative of non-identical scenes. These video signals are then displayed at a picture reproducing station on a common picture reproducing device such as a cathode ray tube, with unlike but overlapping scanning rasters. The video signals during, say, odd numbered fields, typically present one scene at one scale while the video signals on, say, even numbered fields typically present a fraction of that scene at a larger scale.

BRIEF DESCRIPTION OF DRAWINGS

The invention will now be further described in terms of a number of presently preferred exemplary embodiments and with reference to the accompanying drawings in which.

DESCRIPTION OF PREFERRED EMBODIMENTS

Figure 1:
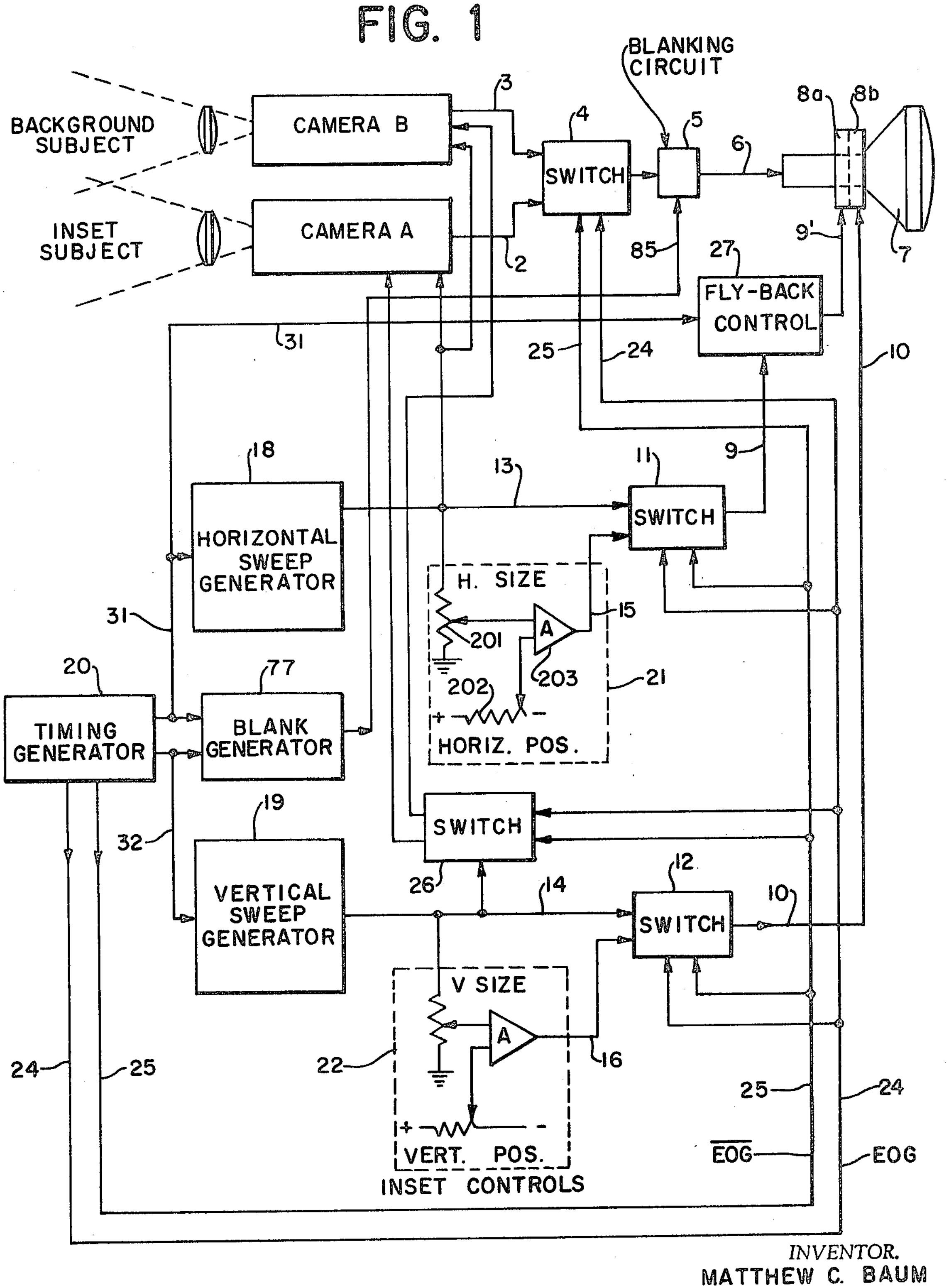
FIG. 1 is a block diagram of a television communication system in accordance with the invention.

Referring to FIG. 1, there are shown two television cameras A and B. Each of these includes a television camera pickup tube such as an iconoscope, orthicon or image orthicon, a lens (as shown) to focus onto the photosensitive surface of the tube a scene to be televised, deflection coils for deflection of the scanning beam in the tube, and other conventional elements. In one typical use of the system of FIG. 1 camera A forms on the photosensitive surface of its pickup tube an image at a relatively large scale of a relatively small object in the primary object field of interest in a scene to be televised, whereas camera B forms on the photosensitive surface of its pickup tube an image at a smaller scale of the entire object field including the object or objects of primary interest and also surrounding background material. The cameras form on lines 2 and 3 separate video signals representative respectively of this "inset subject" and "background subject." These video signals are fed through a switch 4 and a blanking circuit 5 to a cathode ray picture tube 7. Switch 4 operates to deliver to the picture tube 7 first the video signal from the camera A and then the video signal from the camera B, in cyclic fashion. The video signals from the cameras A and B are developed in accordance with a pattern of line and field scanning signals derived, in the particular embodiment illustrated, from a horizontal sweep generator 18 and vertical sweep generator 19.

There may be employed, for example, a scanning pattern made up of frames each including four interlaced fields of lines. The image formed in camera A may then be scanned on the first and third fields of each frame while the image formed in camera B is scanned on the second and fourth fields of each frame. To this end the vertical sawtooth signal, developed at field frequency in generator 19, is passed to a switch 26 which receives from a timing generator 20 via lines 24 and 25 square wave control signals EOG and $\overline{EOG}$ of opposite phase and having a repetition rate equal to one half the field frequency. Under control of these square waves the switch 26 applies, say, odd numbered cycles of the vertical scanning signal to camera A and even numbered cycles thereof to camera B. The same horizontal scanning signals, developed at line frequency in horizontal sweep generator 18, may be applied continuously, on all fields, to both cameras, as indicated in FIG. 1. Or, if desired, switches or gates may be provided to suppress at each camera the horizontal sweep signals except during fields wherein vertical scanning signals are applied at those cameras respectively. Alternatively, both cameras may scan their images both vertically and horizontally on all fields, switch 4 serving to discard the outputs from each camera on fields during which it is the output from the other camera that is to be presented in the picture tube 7.

The display kinescope or picture tube 7 has associated therewith horizontal deflecting coils 8*a* and vertical deflecting coils 8*b*. These are energized respectively with horizontal sawtooth sweep currents arriving on a line 9′ and with vertical sawtooth sweep currents arriving on a line 10. The video outputs of cameras A and B are displayed simultaneously on tube 7 (so far as the eye is able to perceive), by the use in that tube 7 of scanning or sweep currents of one amplitude on the fields during which camera A is connected to the tube and of another amplitude on fields during which camera B is connected to the tube. Thus, the small scale video picture from camera B is presented on a large raster by means of large amplitude scanning currents, while the large scale video picture from camera A is presented on a smaller raster by means of smaller amplitude scanning currents.

The horizontal sweep line 9′ is connected via a fly-back control 27 to a line 9 constituting the signal output of a switch 11. The switch 11 has two signal inputs 13 and 15 carrying horizontal or line sweep voltages and it has two control inputs EOG and $\overline{EOG}$ from lines 24 and 25. The vertical sweep line 10 constitutes the output from a similar switch 12 having signal inputs at 14 and 16 carrying vertical sweep currents and having also the same control inputs EOG and $\overline{EOG}$ from lines 24 and 25, which also constitute control inputs to the switch 4.

Switches 4, 11 and 12 are thus operated in synchronism so that the horizontal and vertical sweep signals are shifted simultaneously, as between horizontal sweep inputs 13 and 15 at switch 11, and as between vertical sweep inputs 14 and 16 at switch 12, with the shift at switch 4 as between the connection of the video signals on lines 2 and 3 to line 6.

More particularly, when the control signals EOG and $\overline{EOG}$ on lines 24 and 25 set switch 4 to the condition in which line 3 is connected to line 6, those control signals also set switches 11 and 12 so as to connect line 13 to line 9 and line 14 to line 10. Under these conditions the background video signal from camera B is displayed on the kinescope 7 with the aid of a raster pattern of horizontal and vertical scanning currents delivered from the generators 18 and 19 directly via lines 13 and 14. These scanning currents are of amplitudes such as to display the video information from camera B on a raster pattern occupying the full screen area in the kinescope 7.

After display of one field, switches 4, 11 and 12 are shifted by the reversal in polarity of the square wave control signals on lines 24 and 25 so as to connect effectively lines 2 and 6, 15 and 9, and 16 and 10.

The horizontal sweep signal on line 15 is of reduced amplitude compared to that on line 13 by the action of the horizontal inset control circuit 21. Similarly the vertical sweep signal on line 16 is of reduced amplitude compared to that on line 14 by the action of the vertical inset control circuit 22. These sweep signals of reduced amplitude present for the duration of one field, over a raster area of reduced size on the screen of tube 7, the video information from camera A.

For the next, i.e., the third field, camera B is re-connected to the kinescope 7 and switches 11 and 12 are shifted, synchronously with switch 4 to restore the raster at the kinescope 7 to full amplitude, and so on, successive fields presenting on rasters of areas large and small size on tube 7 the video information scanned during the times of those fields in cameras B and A successively. If the scanning pattern includes four interlaced fields, as has been assumed, the frame is completed with the fourth field, presenting the video output of camera A again over a small raster area.

Figure 2:
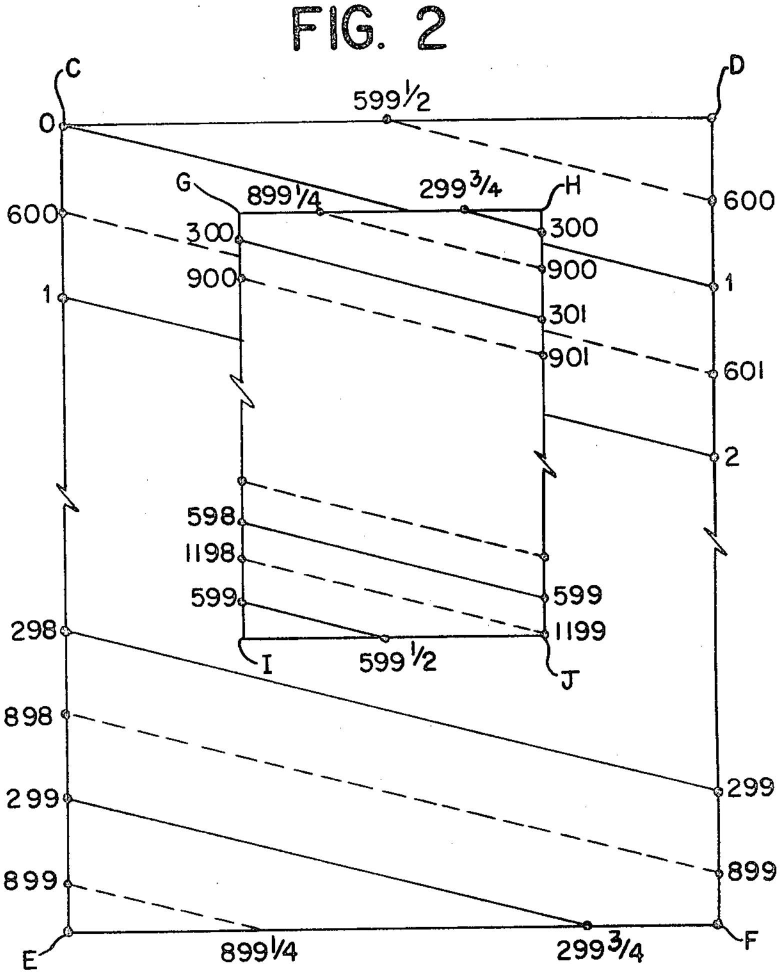
FIG. 2 is a diagram representing a scanning pattern which can be employed for the display of the television image at the receiving station in the system of FIG. 1.

FIG. 2 illustrates by means of the larger rectangle CDEF there shown the full sized raster employed when lines 3, 13 and 14 are connected through switches 4, 11 and 12 to lines 6, 9 and 10. The smaller rectangle GHIJ in FIG. 2 illustrates the smaller raster over which the cathode ray beam of the tube 7 is scanned when instead switches 4, 11 and 12 connect lines 6, 9 and 10 to lines 2, 15 and 16 respectively.

Figure 3:
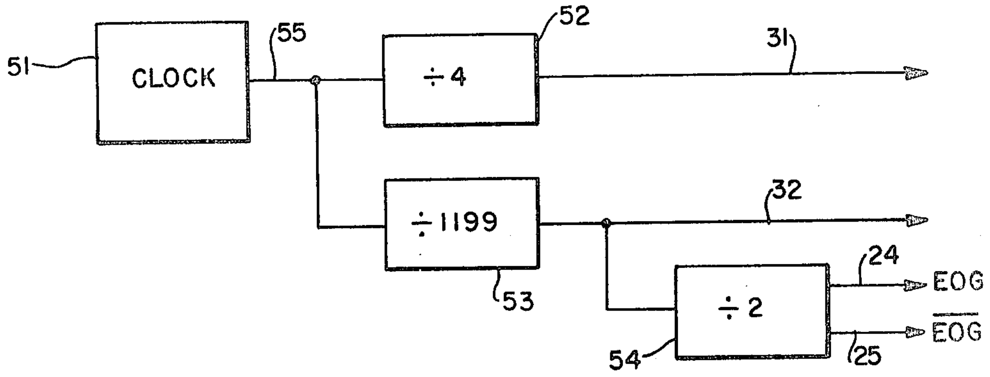
FIG. 3 is a block diagram of the timing generator 20 of FIG. 1.

These scanning signals, of both large and reduced amplitude, are derived ultimately from the timing generator 20, shown in further detail in FIG. 3. In one exemplary embodiment of the invention the timing generator 20 includes a "-clock" or oscillator 51 generating an output signal on line 55 having a repetition rate of 143,880 Hz. This frequency is suitable to the generation of a raster made up of frames each containing 1,199 lines and presented at a rate of 30 per second, each frame comprising four fields of 299-3/4 lines with four-fold interlace. Specifically, 1,199 lines per frame multiplied by 30 frames per second, multiplied by four is equal to 143,880.

A counter 52, which may be of conventional nature, divides the output signal of the oscillator 51 by four, providing on line 31 a signal having a repetition rate of 35,970 Hz. This is the line frequency. As shown in FIG. 1, line 31 constitutes an input to horizontal sweep generator 18 and also to a fly-back control 27 to be described presently.

In FIG. 3 the output signal from the oscillator 51 is additionally divided by a factor of 1,199 in a dividing circuit 53, which may again be of conventional nature, to provide a 120 Hz. signal on line 32 which leads in FIG. 1 to the vertical sweep generator 19. In the exemplary case assumed, 120 Hz. is the field frequency. Lastly, the timing generator 51 includes as shown in FIG. 3 a divider circuit 54 which develops two square waves EOG and $\overline{EOG}$ of 30 Hz. repetition rate on lines 24 and 25.

Figures 4A, 4B, 4C, 4D, 4E, 4F:
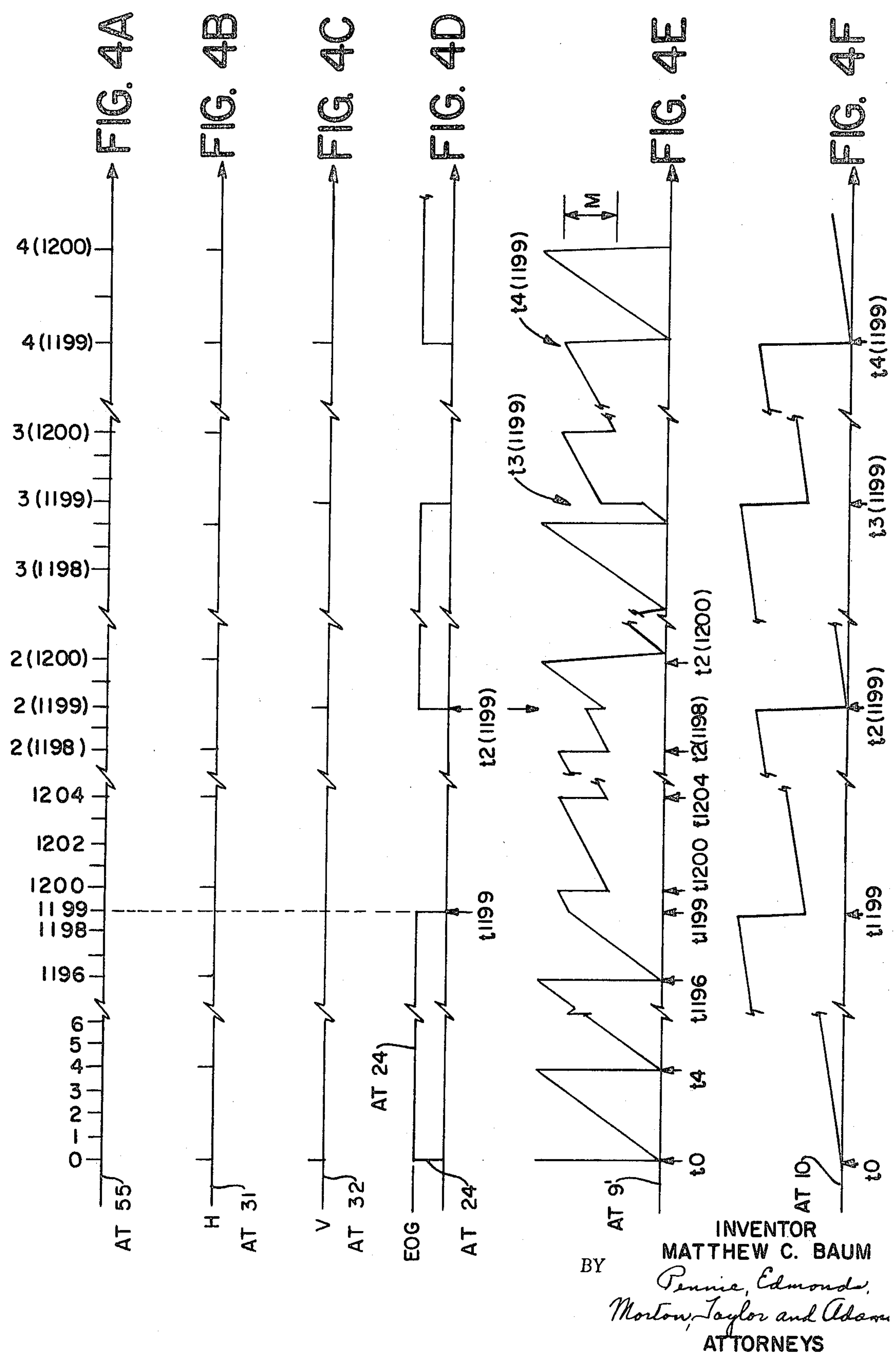
FIGS. 4A through 4F are a series of waveform diagrams to a common time scale useful in explaining the operation of the system of FIG. 1.

The signals on lines 55, 31, 32 and 24 are illustrated in FIGS. 4A through 4D. The output signal from the oscillator 51 may advantageously be of pulse shape. In FIG. 4A these pulses are shown as narrow spikes, i.e., as the leading edges of the short pulses delivered from that oscillator. The pulses are numbered consecutively, with gaps, from zero to 1,199, on to two times 1,199 or 2,398, written 2(1,198), on to four times 1,199, written 4(1,199), and to four times 1,199 plus one, written 4(1,200), there being moreover four gaps in the time base. FIG. 4A is thus representative of the signal on line 55 of FIG. 3. FIG. 4B shows one pulse for every four pulses in FIG. 4A. FIG. 4B thus shows pulses at line frequency and is representative of the signal on line 31. FIG. 4C similarly shows pulses at field frequency, one for each 1,199 pulses in FIG. 4A and for each 299-3/4 pulses in FIG. 4B. Lastly, in FIG. 4D there is shown one of the square wave signals EOG and $\overline{EOG}$ which goes through one cycle for every 2,398 pulses in FIG. 4A.

The scanning pattern at the kinescope 7 is illustrated in FIG. 2. It includes a first field made up of 299-3/4 lines occupying a large raster area CDEF. The first line is identified as 0–1, the second as 1–2, the 299th as 298–299, and the last fractional line as 299–299-3/4. The second field, scanned over a raster area GHIJ of reduced amplitude both horizontally and vertically, includes a first fractional line 299-3/4–300. It then includes a succession of full length lines, the first of which is identified as 300–301 and the last of which is identified as 598–599, and lastly a second fractional line identified as 599–599-½. This second field therefore includes, like the first one, 299-3/4 scanning lines in the aggregate.

The lines of these first two fields are shown in full lines in FIG. 2.

The third field, again made up of 299-3/4 lines, is a field scanned at full amplitude vertically and horizontally over the raster area CDEF. It begins with a fractional line identified as 599-½–600. It then includes 299 full length lines, the first of which is identified as 600–601 and the last of which is identified as 898–899. Lastly, this third field includes a second fractional line identified as 899–899-¼. The fourth field presented at reduced amplitude completes the frame with 299-3/4 lines, the first of which is a line of three-quarters line length identified as 899-¼–900. There then follow 299 full length lines, the first of which is identified as 900–901 and the last of which is identified as 1198–1199. It will be seen that the last line of the frame ends at the lower right-hand corner of the scanning pattern so that the first field of the next following frame will begin at the upper left-hand corner of the scanning pattern, as is desired.

It will be understood from the foregoing that the picture presented to the viewed comprises two interlaced fields extended over one area CDEF of the kinescope and two interlaced fields extended over a different area of the kinescope — such as the smaller area GHIJ within the area CDEF in FIG. 2. If the information on the large raster area CDEF is of low resolution, as will be the case when camera B is focused on a large object scene, whereas the information on the small raster area GHIJ is of high resolution, as will be the case when camera A is focused on a small object scene, the observer tends to perceive preferentially over the GHIJ area of the kinescope, the information originating with camera A. The discrimination may be assisted by gating the tube 7 to a higher brightness, e.g., on a control electrode in the electron gun thereof, during fields laid down on the smaller area.

The line scanning currents (or the voltages proportional thereto from which they are derived) are illustrated in FIG. 4E. A first line scan is shown extending from time $t0$ of the 0'th pulse of FIG. 4A to the time of the fourth pulse in FIG. 4A. The first portion of the second line-scanning voltage is then shown, and, after a gap in the time base, the last portion of the 299th line scan which is completed at $t1196$, the time of pulse 1196 in FIG. 4A. These are line scans of full amplitude and of full time duration as indicated by the full width raster lines 0 to 1, 1 to 2, and so on through 298 to 299 in FIG. 2. In FIG. 4E the line scan beginning at $t1196$ continues through three pulse intervals 1196 to 1199 of FIG. 4A. This corresponds to the three-quarters length line 299–299-3/4 on the large raster in FIG. 2. At $t1199$ the sawtooth of FIG. 4E is converted into a fractional line scan one-quarter of a horizontal line period in duration and also of reduced amplitude occurring between $t1199$ and $t1200$. This corresponds in FIG. 2 to scanning of the cathode ray beam over the fractional line 299-3/4–300 of reduced amplitude in the small raster. FIG. 4E then shows between $t1200$ and $t1204$, the times of pulses 1200 and 1204 in FIG. 4A, a line scan voltage of reduced amplitude corresponding to the full duration scanning line 300–301 in FIG. 2. There then appears in FIG. 4E a fraction of the next succeeding reduced amplitude full duration horizontal line scan. This is followed by the second break in the time base, after which is shown the last portion of the reduced amplitude sawtooth which produces line scan 598–599 of FIG. 2 and which terminates at $t2(1198)$. Then follows in FIG. 4F a fractional line scan having the duration of two pulses in FIG. 4A, namely from 2(1198) to 2(1199). This accounts for the scanning of the half length line 599–599-½on the small raster in FIG. 2.

With the scanning of the fractional line 599–599-½, the second field of the frame is completed and the line scan voltage returns to full amplitude for scanning of the half line 599-½–600 of FIG. 2 between times $t2(1199)$ and $t2(1200)$ of FIG. 4E. The third field begins with this half line and concludes with a line of one-quarter length, namely the line 899–899-¼ of FIG. 2, and which terminates at time *t*3(1199) in FIG. 4E. There then begins a fourth field which starts with a line of three-quarters length indicated on the small raster in FIG. 2 as the line 899-¼–900, and which concludes at time *t*4(1199) in FIG. 4E with a last full duration line scan of reduced amplitude, namely the line 1198–1199 in FIG. 2.

The generation of the vertical scanning currents is illustrated in FIG. 4F. A large amplitude sawtooth corresponding to the first field extends from *t*0 to *t*1199. This is followed by a small amplitude sawtooth corresponding to the second field and extending from *t*(1199) to *t*2(1199), and so on.

The inset control circuits 21 and 22 of FIG. 1 by means of which the raster patterns of two sizes are obtained may be similar except in component values. Each includes a potentiometer, indicated at 201 for the circuit 21, for manual selection of a desired fraction of the available sweep voltage and a second potentiometer 202 by which the reduced raster GHIJ can be positioned on the kinescope tube face, horizontally in the case of circuit 21 and vertically in the case of circuit 22. Each circuit also includes an amplifier, indicated at 203 in circuit 21, in which the positioning voltage and the selected fraction of the sweep voltage are added. This sum voltage passes, in the case of circuit 21, to line 15 and thence to the switch 11. By means of the four potentiometer controls thus provided, the raster GHIJ can be made of any desired size and can moreover be located as desired on the face of the tube 7.

Figure 5:
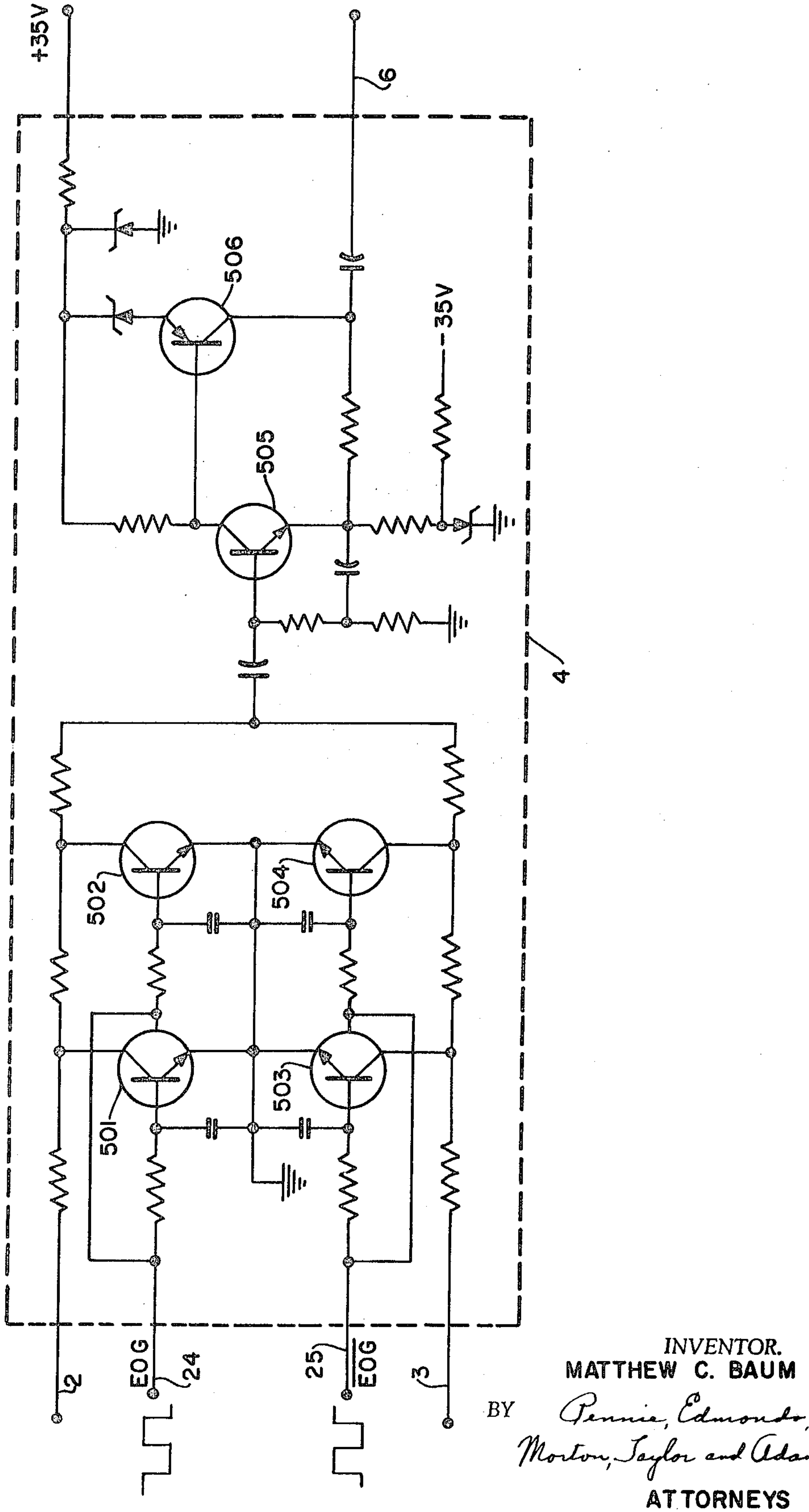
FIG. 5 is a schematic diagram of one circuit which can be employed in the switch 4 of FIG. 1.

One form of circuit suitable for switch 4 is shown in FIG. 5 of the drawings. The dash-line box 4 representative of the switch is shown as provided with video signal inputs on the lines 2 and 3 from the cameras A and B of FIG. 1 and with the switching signal inputs on the lines 24 and 25 of FIG. 1. These carry the opposite phase square wave control signals EOG and $\overline{\text{EOG}}$. When the signal on line 24 is positive, that on the line 25 is negative and vice versa. The positive input to line 24 causes transistors 501 and 502 to conduct, thereby shunting the video signal on line 2 to ground. The negative signal then present on line 25 maintains the transistors 503 and 504 in non-conducting condition so that the video signal on line 3 carries through to a video amplifier comprising transistors 505 and 506 from which the video signal thus selected passes to line 6 for delivery to the kinescope 7 of FIG. 1. Conversely when the control signal $\overline{\text{EOG}}$ raises the voltage of line 25, transistors 503 and 504 are rendered conductive shunting to ground the video signal on line 3. At these times the control signal EOG is negative, holding transistors 501 and 502 in non-conductive condition so that it is the video signal on line 2 which passes to the output line 6. Transistors 501 through 504 may advantageously be NPN bilateral transistors of type 2N1994.

Figure 6:
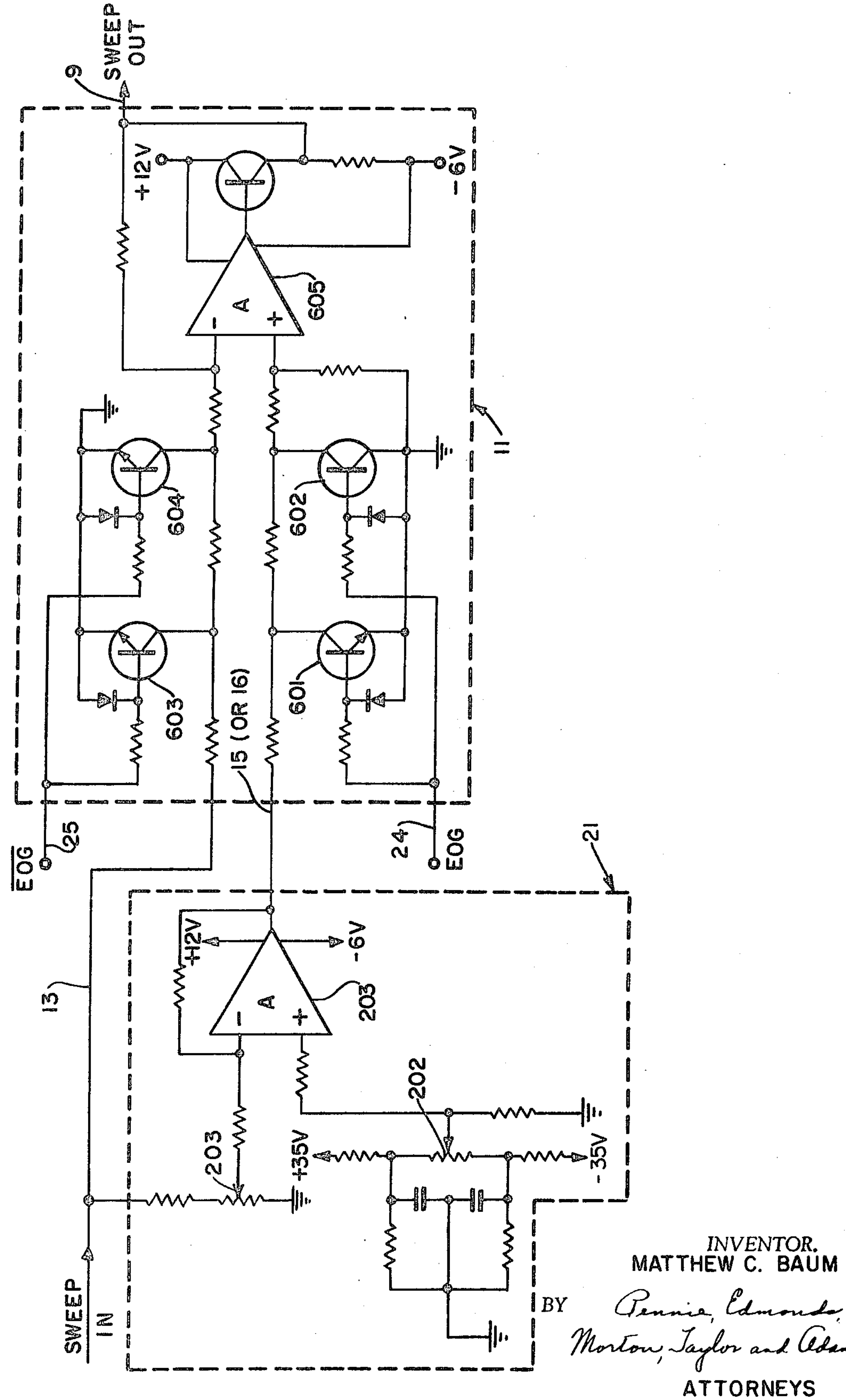
FIG. 6 is a schematic diagram illustrating forms of circuits which can be employed in the inset controls 21 and 22 and in the switches 11 and 12 of FIG. 1.

A schematic diagram of a circuit suitable for use in the circuits 21 and 22 of FIG. 1, and in the associated switches 11 and 12, is shown in FIG. 6. The inset circuit 21 is shown in FIG. 6 in substantially the same form as in FIG. 1, but with added conventional elements which are believed not to require discussion. The switch 11 is similar to the switch 4 of FIG. 5. A pair of transistors 601 and 602 serves, when the control signal EOG is positive, to shunt to ground the sawtooth of reduced amplitude delivered from the circuit 21 whereas the then negative value of the signal $\overline{\text{EOG}}$ keeps the transistors 603 and 604 non-conducting so that the full amplitude sawtooth signal on line 13 can pass to an amplifier 605 and thence to line 9. The transistors 601 to 604 may be of the type mentioned above in connection with FIG. 5.

Figure 7:
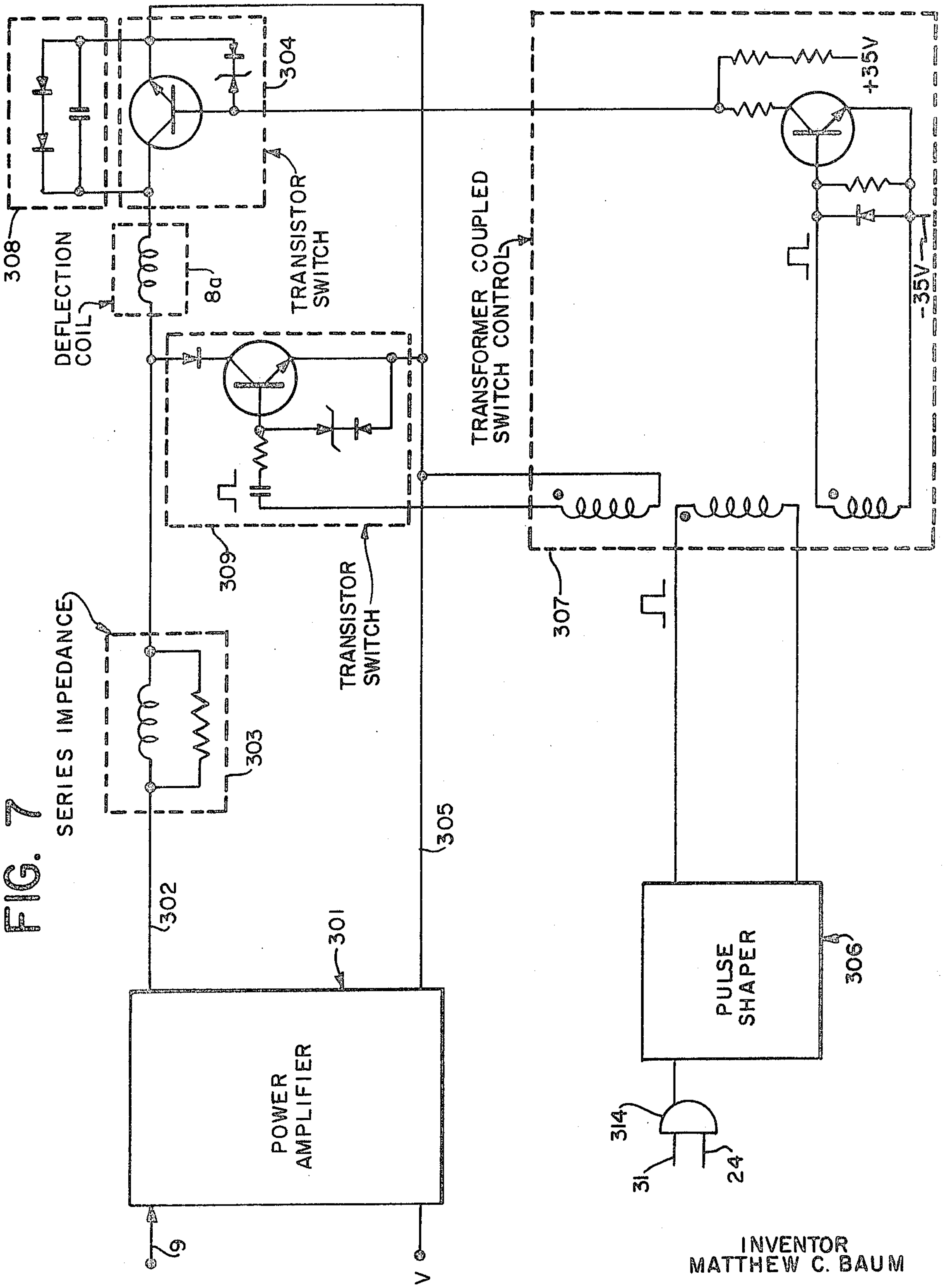
FIG. 7 is a diagram partly in block form and partly in schematic form of the fly-back control 27 of FIG. 1.

There is shown in FIG. 1 a fly-back control 27 receiving as input the pulses at line frequency on line 31 and also the line scanning voltages of sawtooth shape shown in FIG. 4E. The function of the circuit 27 is to develop the large voltage necessary to return the current in the horizontal deflection coil 8*a* from maximum value of one sign to maximum value of the opposite sign at the end of the horizontal line scans during fields which cover the large raster area CDEF of FIG. 2. A circuit suitable for this purpose is shown schematically in FIG. 7. In FIG. 7 there is shown a power amplifier 301 which receives as an input on line 9 the horizontal scanning voltage from the switch 11. Amplifier 301 functions as a voltage to current converter, producing a current proportional to the voltage applied to it. This current is delivered, through a series impedance indicated by way of a dash-line box 303, to the horizontal deflection coil 8*a*. From the deflection coil the circuit leads through a transistor switch indicated at a dash-line box 304 and thence back to the power amplifier 301. A circuit including a capacitor and shunting diodes, shown at a dash-line box 308, is inserted in series with the deflection coil when switch 304 is opened, and is effectively short-circuited when that switch is closed. A second transistor switch indicated at a dash-line box 309 makes it possible to connect the deflection coil 8*a* and the capacitor-diode circuit 308 into a closed loop with the aid of the transistor switch 304. These switches 304 and 309 are under control of a transformer coupled switch control circuit 307.

At all times other than the time of horizontal retrace on the large raster CDEF the horizontal deflection coil current is transmitted along line 302 through the impedance 303, the deflection coil 8*a* and the transistor switch 304 to the return line 305 (or else along that path in the opposite direction), switch 304 being closed and the switch 309 being open. Under the joint control of the EOG square wave on line 24 and the line frequency pulses on line 31, the transformer coupled switch control 307 operates at the end of each horizontal scanning line on the large raster to open the switch 304 and to close the switch 309. In this way the deflection coil 8a and the capacitor-diode circuit 308 are effectively connected into a closed loop. The capacitor in the circuit 308 and the deflection coil 8*a* form a resonant circuit, with a large current flowing through the deflection coil. This current progressively declines in amplitude and a corresponding charge accumulates on the capacitor 308. After a quarter of a cycle of the resonant oscillations to which the coil 8*a* and capacitor in the circuit 308 are susceptible, all of the energy originally present in the coil 8*a* is transferred to the capacitor, just as the current declines to zero. The circuit is allowed to resonate for another quarter cycle during which the energy flows back from the capacitor to the coil 8*a*, wherein the current builds up in the opposite direction. At this time switches 304 and 309 are reset, switch 304 closing and switch 309 reopening. From this large reverse value of current through the deflection coil, the current starts to decline toward a zero value and then to reverse once more, building up the usual line scanning sawtooth current of FIG. 4E.

The switches 304 and 309 are operated by means of the transformer coupled switch control 307 which receives pulses at line frequency from a pulse shaper 306 during the fields of large raster scan. This is achieved by delivering the line pulses on line 31 to the pulse shaper 36 through an AND gate 314 to which is applied as a second input the EOG signal on line 24. Positive output pulses from the pulse shaper 306 serve to raise the base of the transistor in circuit 309, thereby effectively closing the switch which that circuit represents. These pulses similarly turn on the transistor of circuit 307, thereby lowering the voltage at the base of the transistor in circuit 304 to cut off conduction in that latter transistor and thereby opening the switch which circuit 304 provides.

FIG. 8 illustrates, again in block diagram form, the horizontal and vertical sweep generators 18 and 19 and the blanking signal generator 77 of FIG. 1. The generator 18 includes a monostable multivibrator 71 and a sawtooth generator 91, which may be conventional. Line 31 supplies pulses at horizontal line scanning frequency to the multivibrator 71. The shift of the latter to its unstable mode, in response to those pulses, is employed to trigger the sawtooth generator 91 into retrace. Return of multivibrator 71 to its stable mode starts the trace in generator 91. These events are shown at waveforms *a*, *b* and *d* in FIG. 9. A horizontal blanking signal is generated, at line frequency, in a monostable multivibrator 81 of the blanking generator 77. This signal, shown at waveform *c* in FIG. 9, passes through an OR circuit 83 to the line 85 and thence to the blanking circuit 5 of FIG. 1.

Figure 8:
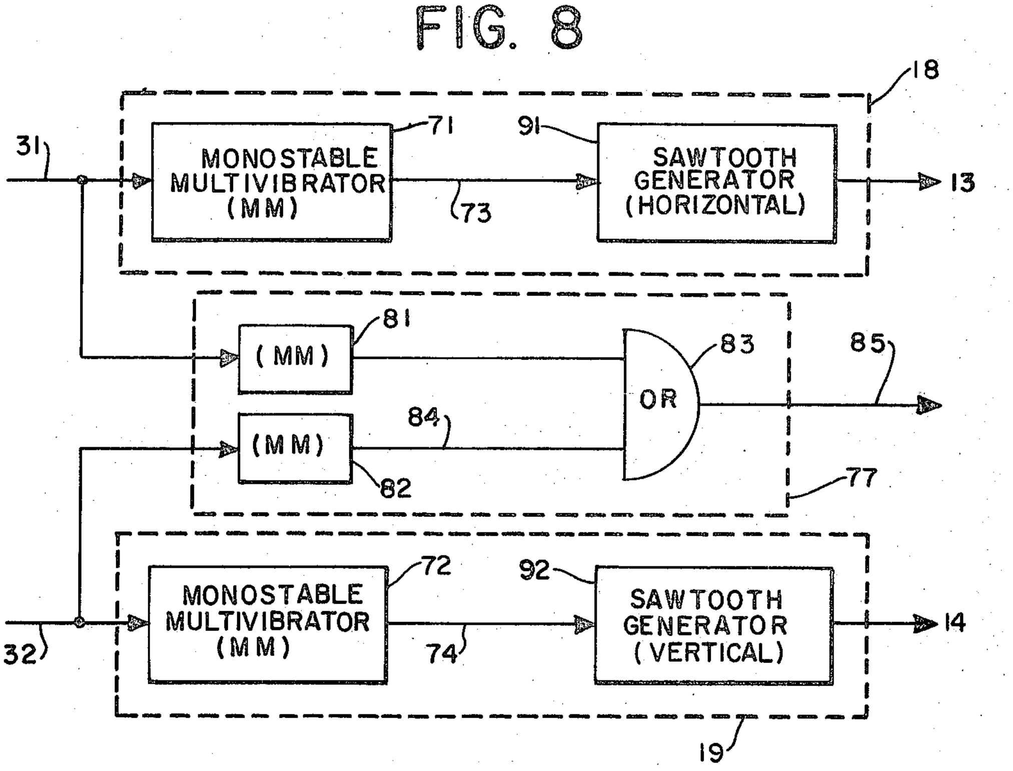
FIG. 8 is a diagram showing in further detail the sweep generators 18 and 19, and the blanking generator 77 of FIG. 1.
Figures 9, 10:
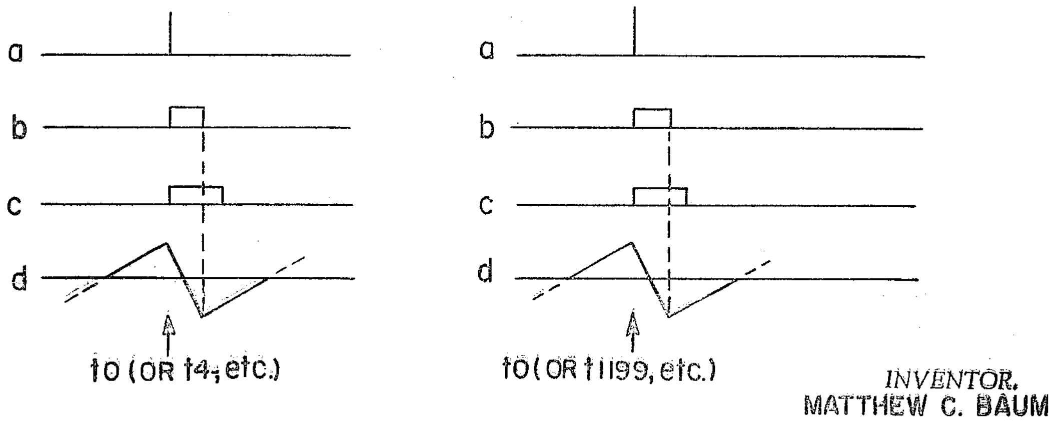
FIGS. 9 and 10 are two sets of waveforms useful in explaining the operation of the circuit of FIG. 8.

In similar fashion, as indicated at waveform *a* in FIG. 10, pulses at field frequency on line 32 are applied to the monostable multivibrator 72 in FIG. 8. When multivibrator 72 is shifted by those field frequency pulses to its unstable mode, the vertical sawtooth generator 92 starts its retrace. These events are shown at waveforms *a*, *b* and *d* in FIG. 10. A monostable multivibrator 82 of longer delay than the multivibrator 72 generates in the blanking signal generator 77 a vertical blanking signal, as shown at waveform *c* in FIG. 10. This signal passes through the OR gate 83 to blanking line 85. It is to be understood that the time scales in FIGS. 9 and 10 are unequal. In each case, the blanking signal is arranged to be somewhat longer in duration than retrace signal.

These retrace and blanking signals, and the circuits disclosed for generating them, may be conventional in nature.

In the embodiment of FIG. 1 the cameras A and B are coupled to the kinescope 7 via transmission lines carrying video signals and a single source of line and field scanning signals is provided, for the cameras as well as for the kinescope. In such an arrangement the cameras and kinescope will be near each other. The invention is however applicable to television systems in which the cameras are remote from the kinescope and are connected by a communication link, wired or wireless, which may involve application of the video signals and of scan synchronizing signals to a carrier at the transmission station, for example at a point downstream of the switch 4, and recovery of that information from such a carrier signal at the receiving station.

Figure 11:
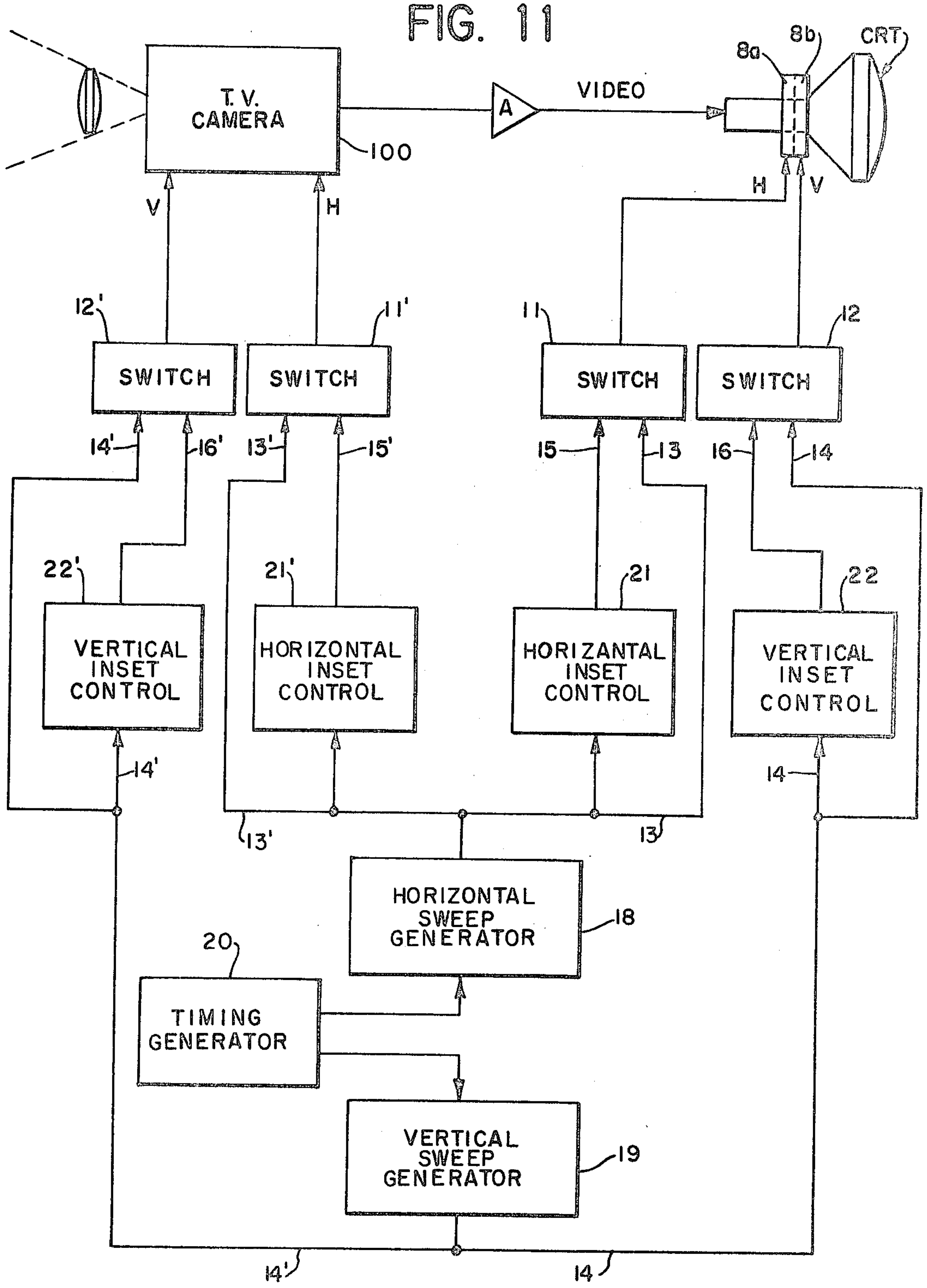
FIG. 11 is a block diagram similar to that of FIG. 1 but illustrating another embodiment of the invention.

FIG. 11 illustrates in block diagram form another form of television system in accordance with the invention. In this embodiment there is provided a single camera 100. It receives horizontal and vertical scanning signals of amplitudes changing on successive fields in a manner which may be similar to that illustrated in FIG. 2. These scanning signals are supplied by switches 11′ and 12′, directly from the horizontal and vertical sweep generators 18 and 19 on the scanning of full sized fields and from those generators via inset control circuits 21′ and 22′ on the scanning of small sized fields. The elements of structure in FIG. 11 bearing unprimed reference characters may be respectively similar to those bearing corresponding reference characters in FIG. 1 while the elements bearing primed reference characters in FIG. 11 may be respectively similar to the elements bearing unprimed reference characters in that figure. The blanking generator 77, blanking circuit 99 and fly-back control 38 of FIG. 1 have been omitted for simplicity from FIG. 11 but these and other conventional television systems components may be provided if necessary or desirable. In the embodiment of FIG. 11, the first and third fields, say, will be scanned over a large area of the photosensitive surface of the pickup tube in the camera while the second and fourth fields are scanned over a part of that area only, to develop a video signal presenting in greater detail a part only of the scene of which a charge image exists in the pickup tube.

While the invention has been described hereinabove in terms of a number of presently preferred embodiments the invention itself is not limited thereto, but rather comprehends all modifications of and departures from those embodiments properly falling within the spirit and scope of the appended claims.

I claim:

1. A television system comprising means to generate a pattern of scanning signals comprising lines and fields, means to generate during successive of said fields video signals representative of unlike scenes, means to provide said scanning signals in unlike magnitudes during successive of said fields, means for the display of said video signals, scanning means for said display means, means to provide said scanning signals in unlike amplitudes, means to apply to said scanning means on successive of said fields said scanning signals of unlike amplitudes, and means to apply to said display means on successive of said fields said video signals representative of unlike scenes.

2. A television system according to claim 1 wherein said video signal generating means comprise a camera having a pickup tube therein and means to apply to said tube scanning signals of unlike amplitudes on successive fields.

3. A television system according to claim 1 including first switching means connected between said cameras and display means, second switching means connected between said display means and said means to provide scanning signals, and means to operate said switching means in synchronism at field frequency.

4. A television system comprising two cameras each having a pickup tube, said system further comprising a source of horizontal and vertical scanning signals defining frames composed of interlaced fields, a cathode ray tube for the display of television images, horizontal and vertical cathode ray beam deflecting means for said display tube, separate means to develop said horizontal and vertical scanning signals in two amplitudes, first switching means to couple said cameras selectively to said cathode ray tube, second switching means to couple said horizontal deflecting means selectively to said horizontal scanning signals in their two amplitudes, third switching means to couple said vertical deflecting means to said vertical scanning signals in their two amplitudes, and means to shift said first, second and third switching means in synchronism at field frequency.

* * * * *

PO-1050
(5/69)

UNITED STATES PATENT OFFICE
CERTIFICATE OF CORRECTION

Patent No. 3,654,386 Dated April 4, 1972

Inventor(s) Matthew C. Baum

It is certified that error appears in the above-identified patent and that said Letters Patent are hereby corrected as shown below:

Column 7, line 47, for "systems" substitute --system--.
Column 8, lines 15 to 17, cancel "means to provide said scanning signals in unlike magnitudes during successive of said fields,".

Signed and sealed this 25th day of July 1972.

(SEAL)
Attest:

EDWARD M.FLETCHER,JR.
Attesting Officer

ROBERT GOTTSCHALK
Commissioner of Patents